L. P. HELM.
CHANGE SPEED GEAR SET FOR MOTOR VEHICLES.
APPLICATION FILED MAY 25, 1917.
1,275,024.
Patented Aug. 6, 1918.
2 SHEETS—SHEET 1.
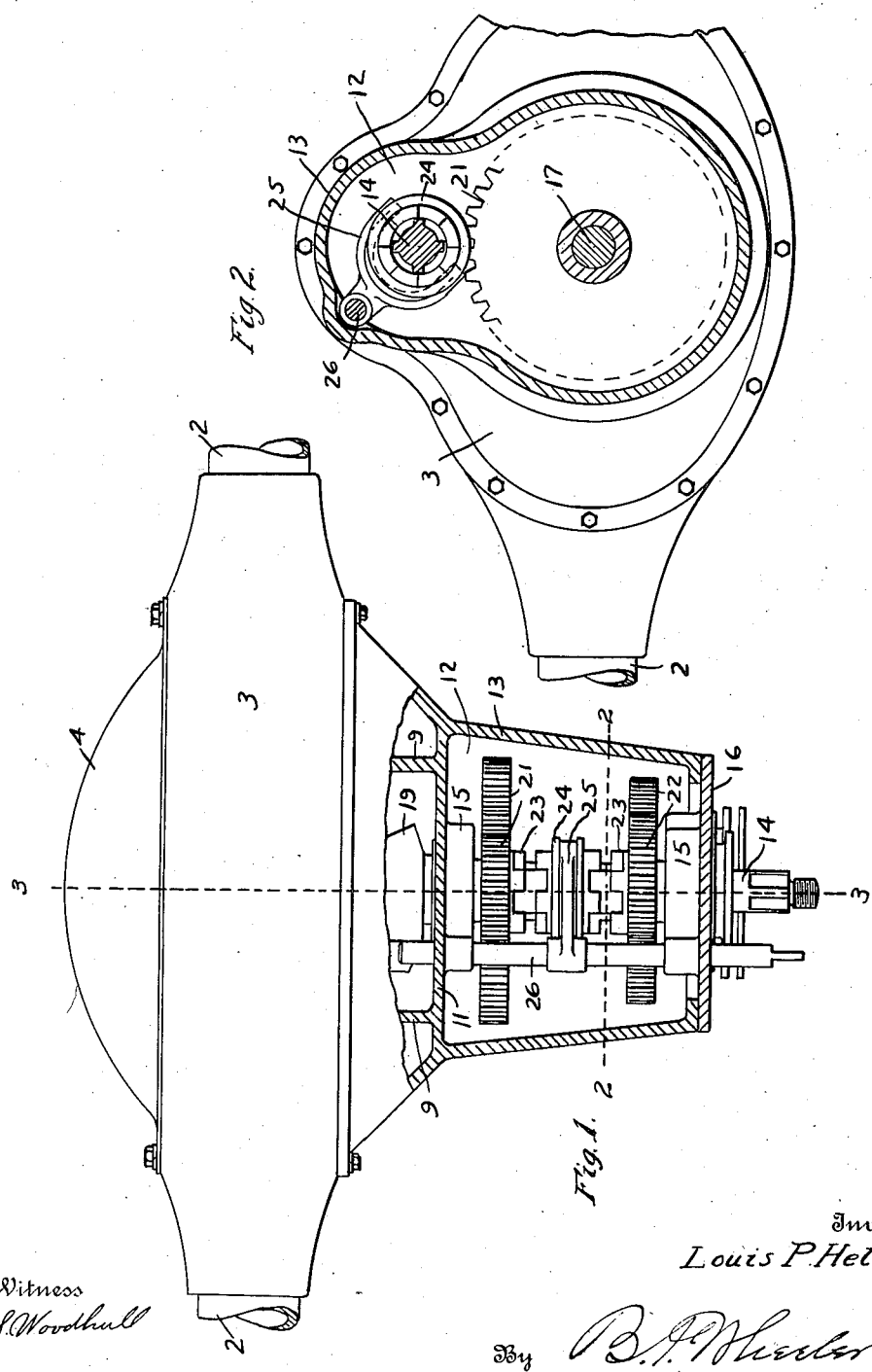
Witness
L. S. Woodhull
Inventor
Louis P. Helm.
By B. J. Wheeler
Attorney

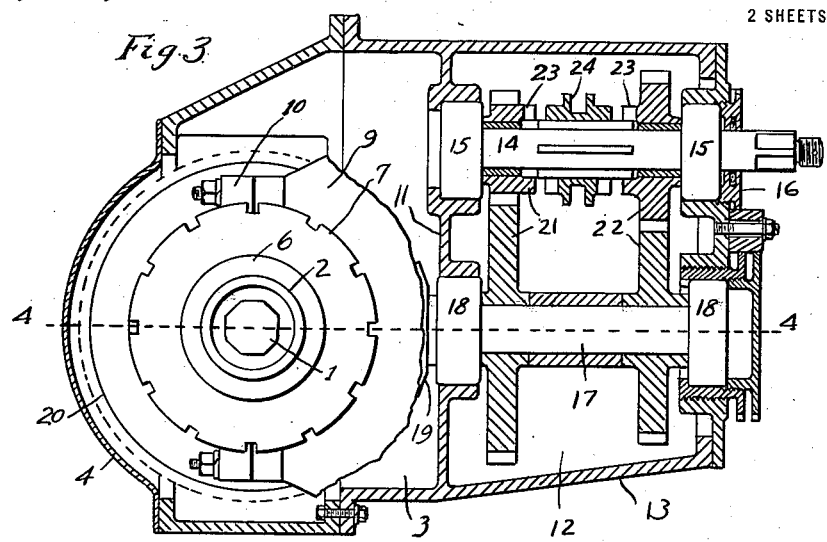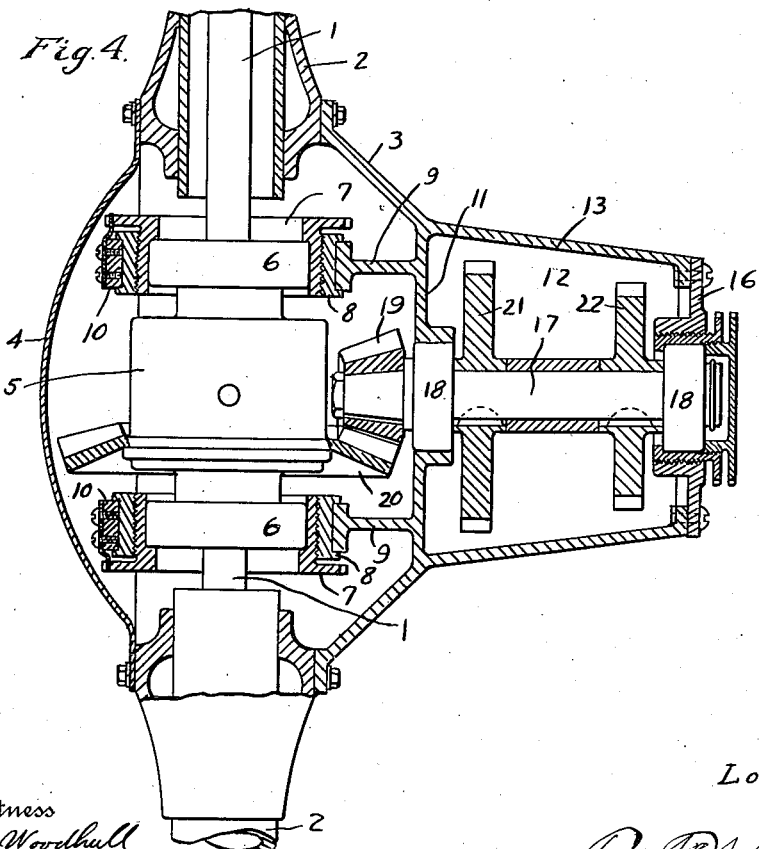

UNITED STATES PATENT OFFICE.

LOUIS P. HELM, OF PONTIAC, MICHIGAN.

CHANGE-SPEED-GEAR SET FOR MOTOR-VEHICLES.

1,275,024.

Specification of Letters Patent.

Patented Aug. 6, 1918.

Application filed May 25, 1917. Serial No. 170,801.

*To all whom it may concern:*

Be it known that I, LOUIS P. HELM, a citizen of the United States, residing at Pontiac, in the county of Oakland and State of Michigan, have invented a new and useful Change-Speed-Gear Set for Motor-Vehicles, of which the following is a specification.

This invention relates to driving axles for motor vehicles, and it consists in the novel features of construction and association of parts as hereinafter set forth and claimed.

The object of the invention is to provide a driving axle especially adapted for use in connection with motor driven trucks and commercial vehicles, in which there is associated with the differential gearing of the axle, independently controlled, change-speed reduction gearing supplemental to the usual transmission gears, so that in emergency there may be obtained through said supplemental gears a greater reduction of speed and increase of power than is obtainable from the ordinary transmission gearing as commonly employed.

In the practice now generally followed in automobile construction, the engine shaft is located at a higher level than the driving axle, necessitating an inclination of the propeller shaft, productive of a considerable friction at the universal joints associated therewith and a consequent loss of power. The material reduction of this friction by extending the propeller shaft in working alinement with the engine shaft, and employing a countershaft in the horizontal plane of an adjacent to the axle is another object sought.

In attaining these objects the invention contemplates employing certain novel features of construction, a preferred embodiment of which is illustrated in the accompanying drawings, wherein, Figure 1 is a plan view of the differential housing of a driving axle showing sectionally a compartment of said housing wherein supplemental change-speed gearing is located in accordance with the present invention. Fig. 2 is a vertical sectional view, taken on line 2—2 of Fig. 1, showing clutch control of the supplemental gears. Fig. 3 is a longitudinal vertical section taken on line 3—3 of Fig. 1, showing in elevation one of the differential axle sections, and parts associated therewith.

Fig. 4 is a horizontal sectional view taken on line 4—4 of Fig. 3.

Referring now to the various parts of the invention by the characters of reference applied in the several views of the drawings, 1 designates the differentially driven sections of a driving axle, and 2 the respective tubular housings for the same. Said housings communicate with and are rigidly secured to a differential gear housing 3, having the usual removable cap portion 4. Within the housing 3 is centrally located the rotatable differential gear case 5, through which the axle sections are adapted to be driven in the usual well known manner. At each side of the member 5 a bearing 6 is provided for the corresponding axle section, said bearings being of the usual anti-friction type and being each supported through intermediate members 7 and 8 by a bracket 9 having a clamping cap 10. The brackets 9 are respectively formed integral with a partition 11 between the differential gear chamber and a chamber 12 formed in an extension 13 of the housing 3.

At a level above the axle, and preferably in substantial alinement with the engine shaft (not shown) a shaft 14 is journaled in bearings 15 respectively mounted in the partition 11, and the detachable cap 16 which closes the free end of the extension 13. The shaft 14 projects through said cap and is fitted for connection with a propeller shaft (not shown) and may itself be regarded as an extension of the propeller shaft. In the horizontal plane of the axle, and beneath the shaft 14, a countershaft 17 is journaled in bearings 18 respectively mounted in the partition 11 and cap 16. Said countershaft is adapted to drive the gear case 5 through a pinion 19 intermeshed with a master gear 20 mounted fast upon said gear case, and is adapted to be itself driven from the shaft 14 through either of two pairs of spur gears 21 and 22, of different driving ratio. The two gears 21 and 22 upon the shaft 17 are mounted fast, while those upon the shaft 14 are loose and are respectively provided with clutch faces 23 alternatively engageable by a slidable clutch 24 splined upon the shaft 14 between said gears. This clutch member is engaged by a yoke 25 carried by a rod 26, the ends of which are respectively slidably mounted in the partition 11 and cap 16. Any suitable means may be provided for actuating the rod 26 from a point adjacent the driver's seat.

By using an extension of the driving axle housing as a mounting and housing for the supplemental change-speed gears, the parts are compactly grouped in a unitary structure, and by positioning the driving shaft above the countershaft and providing said shafts with releasably engageable gears of suitable proportions, variable reductions in speed and consequent increase in driving power is effectively attained for emergency uses, and at the same time providing for the transmission of the power through the propeller shaft normally in more nearly perfect working alinement with the engine.

What I claim is:

In a device of the character described, the combination with two axle sections, of a driving shaft transverse with said sections, a countershaft beneath said driving shaft and substantially in the plane of the axle, variable speed gearing including gears fast upon one of said shafts and intermeshing gears loose upon the other, differential gearing for driving the axle from the countershaft, a housing having a partition forming compartments respectively receiving said differential gearing and variable speed gearing, a clutch member slidable between said loose gears for alternatively establishing the same in fixed relation to the corresponding shaft, and actuating means for said member projecting exteriorly of said housing.

In testimony whereof I sign this specification.

LOUIS P. HELM.